United States Patent [19]

Hanaoka et al.

[11] Patent Number: 4,517,799
[45] Date of Patent: May 21, 1985

[54] HEAT UTILIZING SYSTEM USING INTERNAL COMBUSTION ENGINE

[75] Inventors: Tadashi Hanaoka; Hiroaki Umezu, both of Tokyo, Japan

[73] Assignee: Misawa Home Co., Ltd., Tokyo, Japan

[21] Appl. No.: 559,176

[22] Filed: Dec. 7, 1983

[30] Foreign Application Priority Data

Mar. 9, 1983 [JP] Japan .................................. 58-39424
Mar. 9, 1983 [JP] Japan .................................. 58-39425

[51] Int. Cl.³ ............................................ F25B 27/00
[52] U.S. Cl. .................................. 62/323.1; 62/238.6
[58] Field of Search .......................... 62/238.6, 323.1; 237/2 B; 123/142.5 R, 41.19

[56] References Cited

U.S. PATENT DOCUMENTS

| | | | |
|---|---|---|---|
| 2,162,245 | 6/1939 | Comstock | 62/238.6 X |
| 2,375,157 | 5/1945 | Wilkes et al. | 62/238.6 X |
| 2,597,745 | 5/1952 | Morrison | 62/238.6 X |
| 2,696,085 | 12/1954 | Ruff | 62/238.6 X |

FOREIGN PATENT DOCUMENTS

| | | | |
|---|---|---|---|
| 1009203 | 5/1957 | Fed. Rep. of Germany | 62/238.6 |
| 2548076 | 5/1977 | Fed. Rep. of Germany | 62/238.6 |
| 2804895 | 8/1979 | Fed. Rep. of Germany | 62/238.6 |
| 2610282 | 6/1982 | Japan . | |
| 880093 | 10/1961 | United Kingdom | 62/238.6 |

Primary Examiner—Lloyd L. King
Attorney, Agent, or Firm—Sandler & Greenblum

[57] ABSTRACT

A system for utilizing exhaust heat and the like from an internal combustion engine, in which at least a part of the internal combustion engine is immersed in a heat transfer medium contained in a vessel provided at the top thereof with an opening. The internal combustion engine is supported by a member secured to the opening of the vessel, an anti-vibration member or members are interposed between the member and the vessel and/or an anti-vibration casing covering the support member is provided, thereby facilitating the anti-vibration and sound arresting measures.

20 Claims, 11 Drawing Figures

HEAT UTILIZING SYSTEM USING INTERNAL COMBUSTION ENGINE

BACKGROUND OF THE INVENTION

1. Field of the Invention

This invention relates to a heat utilizing system using an internal combustion engine, and more particularly to a preferable one to be applied to a system using a heat transfer medium contained in a vessel, for feeding hot water, cooling or heating a room in a house.

2. Description of the Prior Art

In general, when an internal combustion engine is used as a power plant, a shaft output amounts to only 25-30% of the input fuel, and the remainder is thrown away as unused. Even if waste heat is to be recovered, expensive heat exchangers, circulation pump and the like are required, and additionally, heat radiating loss to the surroundings and heat exchange loss are unavoidable, whereby the working efficiency was low. In addition, the system has been complicated and expensive because of the piping connection system.

For this reason, there have been proposed systems, in which an internal combustion engine being used as a power plant is directly immersed in a vessel containing therein a heat transfer medium to thereby utilize the waste heat from the internal combustion engine. An example of such proposals is Japanese Utility Model Application Publication No. 26102/82 published on June 7, 1982. However, in the system described in this Publication, an internal combustion engine is secured to the bottom surface or a side wall of a vessel and an output shaft portion of this internal combustion engine penetrates through the side wall to outside, whereby the noises of secondary vibrations of the vessel due to the operation are high so that the effects of reducing the noises and vibrations obtained by the immersion of the engine into the heat transfer medium (for example, water) will be decreased to a considerable extent. In addition, it is difficult to absorb the vibrations and displacement and secure the sealing (against the water leakage) in the penetrating portion, and to perform the maintenance works such as the inspection, repair and the like of the internal combustion engine. Furthermore, the noises are high from the fact that a refrigeration machine or a compressor driven by this internal combustion engine is exposed to outside. Hence, necessity has been voiced for the noise control measures for the system as a whole.

SUMMARY OF THE INVENTION

The present invention has its object the provision of a heat utilizing system for an internal combustion engine, in which waste heat and the like from the internal combustion engine are effectively utilized and the noise control measures can be easily conducted.

To achieve the above-described object, the present invention contemplates that a vessel containing therein a heat transfer medium such as water and provided at the top thereof with an opening is used, and an internal combustion engine is supported by a member such as a support ring, which is secured to the opening of the vessel, at least a portion of the internal combustion engine is immersed in the heat transfer medium, whereby the waste heat from the internal combustion engine is effectively utilized and the vibrations and noises imparted through the vessel are arrested, and further, suitable anti-vibration members can be interposed between the opening of the vessel and the member secured to the opening so as to facilitate the noise control measures.

To achieve the above-described object further better, soundproof casings are provided for covering machines and components such as a generator, compressor and the like, which are driven by the internal combustion engine, and at least a part of the support portion for the internal combustion engine.

DETAILED DESCRIPTION OF THE PREFERRED EMBODIMENTS

Figure 1:
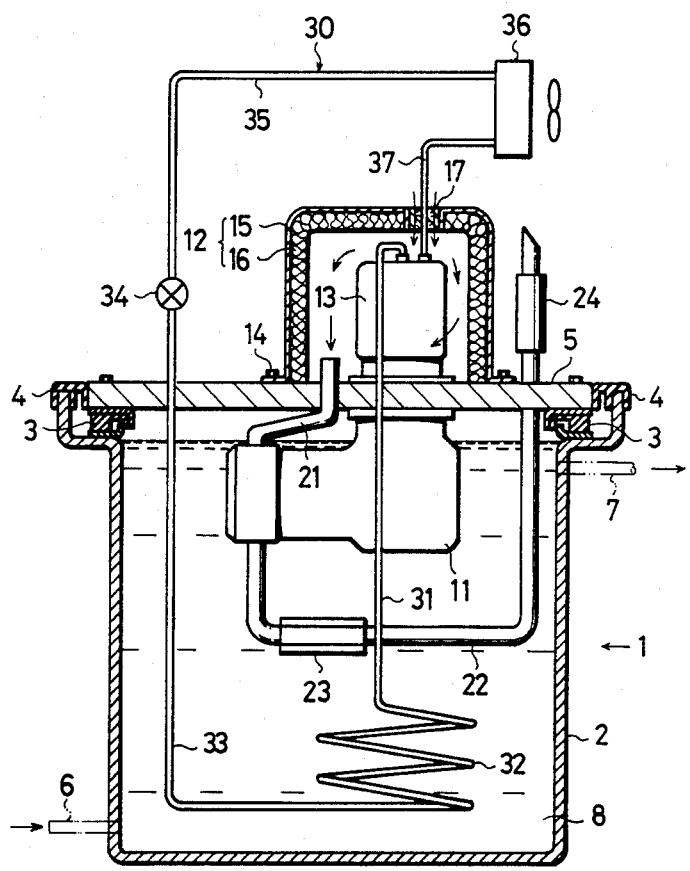
FIG. 1 is a sectional view showing a first embodiment of the present invention.

Description will hereunder be given of the embodiments of the present invention with reference to the drawings. Same reference numerals are used throughout the figures of the respective embodiments to designate same or similar component parts, so that duplicated explanations will be omitted or simplified.

FIG. 1 shows the first embodiment of the present invention. Referring to the drawing, a tank 1 comprises a cylindrical vessel or main body of tank 2 filled up with a heat transfer medium 8 (water in this embodiment) and provided at the top thereof with an opening and a closure 5 water-tightly coupled to the top opening of this main body of tank 2 through anti-vibration members 3 made of rubber or the like and a seal member 4. The anti-vibration members 3 are provided in a gap formed in the vertical direction between the main body of tank 2 and the closure 5 at a plurality of positions in the circumferential direction, whereby the vibrations of the closure 5 are absorbed and not imparted to the main body of tank 2. Furthermore, the seal member 4 is inserted along the circumferential gap formed between the main body of tank 2 and the closure 5 over the total circumference to thereby form the tank 1 into a completely hermetic construction. In this case, as the anti-vibration members 3, when a circular shaped member is used on the opening of the main body of tank 2 over the total circumference thereof to perform the same function of the seal member 4, the seal member 4 may be dispensed with. If the anti-vibration member 3 is formed into the circular shape described above, then the anti-vibration member 3 can sufficiently support the closure 5 and resist a force to move the closure 5.

On the other hand, respectively secured to the closure 5 at the undersurface thereof with an internal combustion engine 11, at least a portion of which is immersed in the heat transfer medium 8 and at the upper surface thereof with a compressor 13 as being a driven component driven by the engine 11 and covered on the upper surface thereof with a soundproof casing 12. The soundproof casing 12 is constituted by a cylindrical vibration control plate 15 secured to the upper surface of the closure 5 through a plurality of bolts 14 and a sound absorbing material 16 adhesively attached to the inner surface of this vibration control plate 15 and having heat insulation properties. The interior of the soundproof casing 12 is communicated with the exterior thereof through a filter 17 provided at a portion thereof. A heavyduty plate, e.g., a composite board made of ferrite, lead, rubber or the like is used as the vibration control plate 15 here. As the sound absorbing material 16, for example, asbestos, glass wools, urethane, honeycomb core or the like is used.

Connected to the engine 11 at an intake port thereof with one end of an intake pipe 21, the other end of which extends through the closure 5 and projects into the soundproof casing 12 and at an exhaust port thereof with one end of an exhaust pipe 22, the intermediate portion of which is immersed in the heat transfer medium 8 and the other end of which extends through the closure 5 and projects to outside. The exhaust pipe 22 is inserted at the intermediate portion thereof close to the engine 11 with a radiator 23 for radiating the exhaust heat from the engine 11 into the heat transfer medium 8 in the main body of tank 2, and provided at the forward end thereof projecting from the closure 5 with a sound conditioner 24, whereby, when the engine 11 is operated, the exhaust heat from the engine 11 is radiated from the radiator 23, with the result that the heat transfer medium 8 in the main body of tank 2 is heated.

Connected to the compressor 13 is a well known heat pump circuit 30. The heat pump circuit 30 is of such an arrangement that a pipe 31 from one connecting port of the compressor 13 is connected to one end of a heat exchanger 32 in the tank 1, a pipe 33 from the other end of this heat exchanger 32 extends through the closure 5 and is connected to an expansion valve 34, a pipe 35 from this expansion valve 34 is connected to one end of a heat exchanger 36 at the other side, and a pipe 37 from the other end of this heat exchanger 36 is passed through the filter 17 of the soundproof casing 12 and connected to the other connecting port of the compressor 13.

As occasion demands, the main body of tank 2 is connected to the lower portion thereof with a supply pipe 6 for city water as being the heat transfer medium and at the upper portion thereof with an outlet pipe 7 as being an outlet for the heat transfer medium 8.

Description will hereunder be given of action of this embodiment. When the compressor 13 is driven by the start of the engine 11, then in the heat pump circuit 30, the heating of the heat transfer medium 8 in the tank 1 or the cooling of the room can be effected in accordance with the well known refrigerating cycle.

On the other hand, when the engine 11 is started, the engine 11 is progressively raised in temperature, and the exhaust gas from the engine 11 is exhausted to outside through the exhaust pipe 22. Then, the heat developed in the engine 11 is directly and the exhaust heat from the engine 11 is through the radiator 23 absorbed by the heat transfer medium 8 in the tank 1, respectively. As the result, the heat transfer medium 8 in the tank 1 is raised in temperature by the radiation of heat from the heat pump circuit 30 in addition to the heat developed in the engine 11 and the exhaust heat therefrom.

The heat transfer medium 8 thus raised in temperature is utilized as the hot water feed, a heat source for heating the room and directly as hot water.

In consequence, according to this embodiment, the compressor 13 is driven by the engine 11 to effect the cooling of the room, simultaneously, through the utilization of the heat developed in the engine 11, the exhaust heat therefrom and the radiation of heat from the heat pump circuit 30, the heat transfer medium 8 in the tank 1 is heated, and this heat transfer medium 8 is utilized as the heat source for the heating and cooling of the room and the hot water feed, so that the energy can be effectively utilized, and the cooling, heating the room and the water feed can be performed by use of the single engine 11.

Furthermore, the engine 11 is secured to the opening of the main body of tank 2 and the anti-vibration members 3 are interposed between the closure 5 supporting the engine 11 and the main body of tank 2, whereby mechanical vibrations and noises from the engine 11 and the compressor 13 are not directly imparted through the main body of tank 2 and further there is no need for worrying about the leakage of the heat transfer medium 8 from the engine mounting portion.

Furthermore, the engine 11 is immersed in the heat transfer medium 8 in the hermetically sealed tank 1 and the compressor 13 is covered by the soundproof casing 12, so that the noises from the engine 11 and the compressor 13 can be reduced from the above point. Additionally, the provision of the soundproof casing 12 is sufficient for only the outer periphery of the compressor 13, so that the system as a whole is rendered compact in size and can be constructed inexpensively. Moreover, the air feed to the engine 11 is effected through the interior of the soundproof casing 12, whereby the soundproof casing 12 functions as the sound conditioner to arrest the intake sound of the engine 11, thus resulting in further reduced noises from the system as a whole.

Further, the soundproof casing 12 is constituted by the vibration control plate 15 and the sound absorbing material 16 which is made of a heat insulating material, so that the compressor 13 is prevented from radiating the heat, thereby improving the working efficiency of the heat pump.

Figure 2:
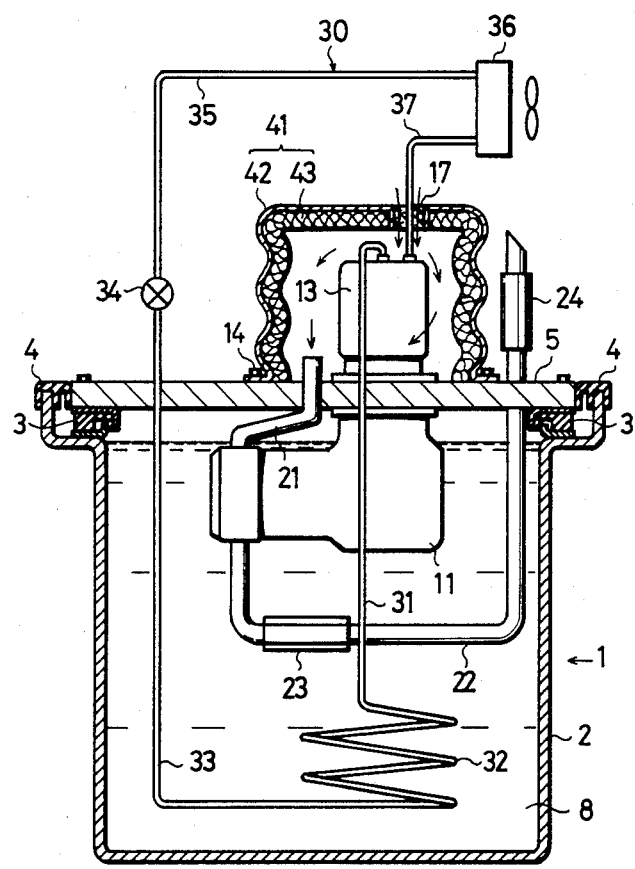
FIG. 2 is a sectional view showing a second embodiment of the present invention.

FIG. 2 shows the second embodiment of the present invention. In this embodiment, there is used a soundproof casing 41 variable in capacity. The soundproof casing 41 is of such an arrangement that a sound absorbing material 43 made of a visco-elastic material such as asphalt or the like is adhesively attached to the inner surface of a vibration control plate 42, and formed into a form of bellows generally expandable or shrinkable in the vertical direction.

In consequence, in the second embodiment, in addition to the advantages described in the first embodiment, if the soundproof casing 41 is expanded or shrunk in the vertical direction depending on the natural number of vibrations of the driven component such as the compressor 13 to thereby vary and set the capacity thereof, then the noise component from the compressor 13 can be absorbed.

Additionally, in the above second embodiment, the soundproof casing 41 is made variable in capacity by forming it into a form of bellows, the capacity variable construction need not necessarily be limited to the above embodiment, the same effect as aforesaid can be achieved by such a construction that, for example, the soundproof casing is constituted by an inner cylinder and an outer cylinder, which are slidable on each other and one of the cylinders is slided on the other to thereby vary the general capacity, i.e., a telescopic construction. Furthermore, the sound absorbing material 43 may be provided on the outer surface or the both inner and outer surfaces of the vibration control plate 42 instead of providing only on the inner surface as described in the above embodiment. Particularly, if the sound absorbing material 43 made of a viscoelastic material is adhesively attached to the outer surface of the vibration control plate 42, then the surface vibrations of the vibration control plate 42 are absorbed, thus further improving the soundproof effect.

Figure 3:
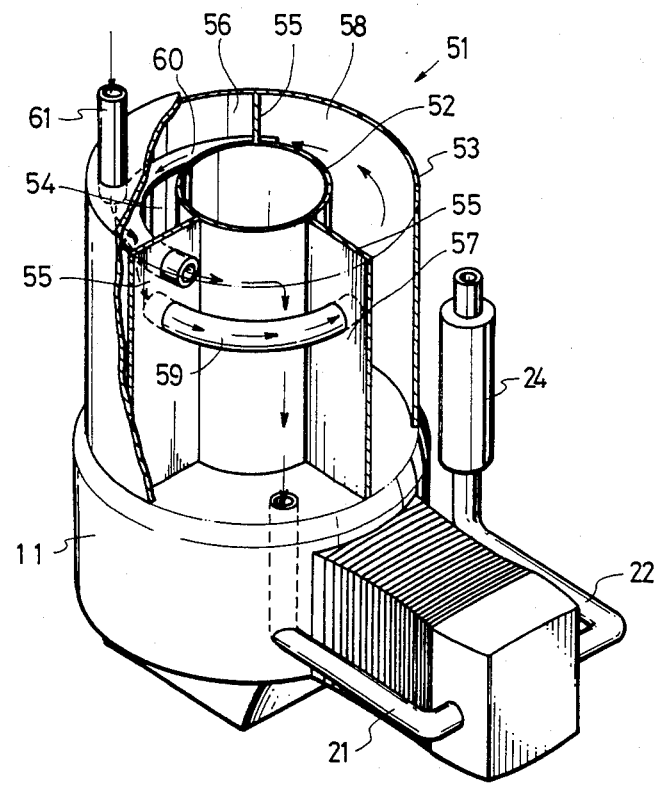
FIG. 3 is a perspective view, partly sectional, showing the essential portions of a third embodiment of the present invention.

FIG. 3 shows the essential portions of the third embodiment of the present invention. In this embodiment, a soundproof casing 51 is formed into a double wall cylinder construction including an inner cylinder 52 an outer cylinder 53, and a sound conditioner 54 as sound conditioning passageways is formed in a space between the inner cylinder 52 and the outer cylinder 53. The sound conditioner 54 is constructed such that a space between the inner cylinder 52 and the outer cylinder 53 is divided into a suitable number of compartments by radial partition walls 55 and these divided compartments 56, 57 and 58 are alternately communicated through communicating pipes 59 and 60. With this arrangement, air introduced through a duct 61 is led through the communicating pipe 59 into the compartment 58 from the compartment 56 and subsequently, led through the communicating pipe 60 into the compartment 57, whereby the air is supplied from the intake pipe 21 to the engine 11 after following the repeated steps of throttling and dispersion.

In consequence, in the third embodiment, in addition to the advantages described in the first embodiment, the intake noises of the engine 11 can be further reduced. Moreover, this sound conditioning construction utilizes the space between the compressor 13 and the soundproof casing 51, so that the system is rendered compact in size and the double wall construction including the inner cylinder and the outer cylinder can perfectly prevent the compressor 13 from radiating the heat, thus further improving the working efficiency of the heat pump.

In addition, in the above third embodiment, if linings of asphalt or the like are applied to the inner surfaces of the compartments 56, 57 and 58, then the sound conditioning effect can be further improved. Furthermore, the same arrangement as described above is applicable to the exhaust side.

Figure 4:
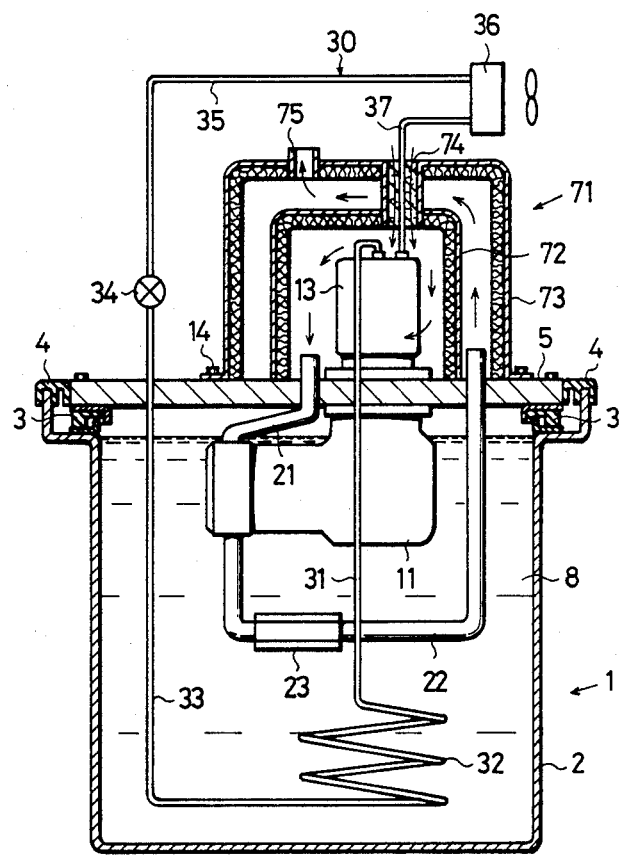
FIGS. 4 through 10 are sectional views showing a fourth embodiment through a tenth embodiments of the present invention.

FIG. 4 shows the fourth embodiment of the present invention. This embodiment is of such an arrangement that a soundproof casing 71 is formed into a double wall construction including an inner casing 72 and an outer casing 73, in which sound absorbing materials are adhesively attached to the inner surfaces of vibration control plates and sound conditioning passageways are formed in the interior and the exterior of the inner casing 72. More specifically, the interior of the inner casing 72 is communicated through a filter 74 with the exterior thereof, a space between the inner casing 72 and the outer casing 73 is communicated through an introduction hole 75 with the exterior, an end of the intake pipe 21 is located within the inner casing 72 and an end of the exhaust pipe 22 is disposed in the space between the inner casing 72 and the outer casing 73.

In consequence, in the fourth embodiment, in addition to the advantages described in the first embodiment, the exhaust noises from the engine 11 can be further reduced. Moreover, since the spaces in the soundproof casing 71 are utilized, there is no need to provide a sound conditioner such as a muffler at the forward end of the exhaust pipe 22 in particular, so that the system is rendered compact in size and the double wall construction including the inner cylinder and the outer cylinder can perfectly prevent the compressor 13 from radiating the heat, thereby further improving the working efficiency of the heat pump.

In addition, in the above fourth embodiment, if sound conditioners for repeating the steps of throttling and dispersion as described in the third embodiment are provided in the inner casing 72 and the space between the inner casing 72 and the outer casing 73, respectively, then the exhaust noises form the engine 11 can be considerably reduced.

Figure 5:
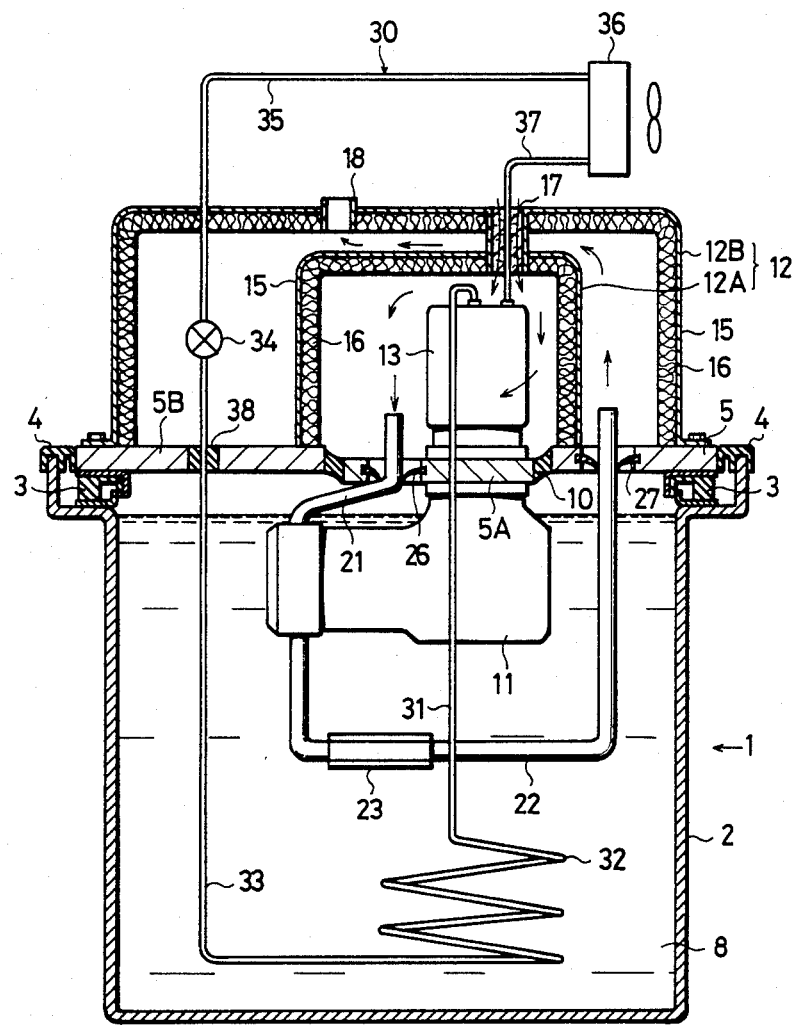

FIG. 5 shows the fifth embodiment of the present invention. This embodiment is of such an arrangement that an engine mounting portion 5A of the closure 5, which is located at the center, is separated from the other portion 5B, the engine mounting portion 5A is supported by the other portion 5B through anti-vibration members 10 made of rubber or the like, and further, the soundproof casing 12 is formed into a double wall construction having two compartments partitioned from each other by an inner casing 12A and an outer casing 12B. The interior of the inner casing 12A is communicated with atmosphere through the filter 17 and the space between the inner casing 12A and the outer casing 12B is communicated with atmosphere through a duct 18. Each of the casings 12A and 12B comprises the cylindrical vibration control plate 15 secured to the upper surface of the closure 5 in a manner to cover the compressor 13 and the sound absorbing material 16 adhesively attached to the inner surface of this vibration control plate 15 and having heat insulating properties.

The engine 11 and the compressor 13 are supported by the engine mounting portion 5A of the closure 5, the intake pipe 21 of the engine 11 is passed through a lip seal 26 provided in the engine mounting poriton 5A and projected into the inner casing 12A, while the exhaust pipe 22 of the engine 11 is passed through a lip seal 27 provided in the other portion 5B of the closure 5 and projected into the space between the inner casing 12A and the outer casing 12B. Further, a seal 38 is provided in a portion of the closure 5, through which is extended a pipe 33 communicating the heat exchanger 32 in the tank 1 and the expansion valve 34, both of which are included in the heat pump circuit 30.

In consequence, in the fifth embodiment, in addition to the advantages described in the fourth embodiment, the mechanical vibrations from the engine 11 and the compressor 13 are absorbed by the anti-vibration members 10, the lip seals 26, 27 and the seal 38, and further, the vibrations imparted to the other portion 5B of the closure 5 are absorbed by the anti-vibration members 3, so that no noises are caused by the mechanical vibrations, and moreover, the mechanical vibrations are further effectively prevented from being imparted to the main body of tank 2. Furthermore, the outer casing 12B of the soundproof casing 12 covers the closure 5 as a whole, so that leaking noises from the closure 5 can be arrested, thereby enabling to further reduce the noises in the system as a whole.

In addition, in the above fifth embodiment, the soundproof casing 12 may be provided only with the inner casing 12A, and such an arrangement may be adopted that the outer casing 12B covers only a portion of the closure 5 as in the embodiment shown in FIG. 4. Even with the above arrangement, the anti-vibration effects by the anti-vibration members 10, the lip seals 26, 27 and the seal 38 in the fifth embodiment will not be reduced.

Figure 6:
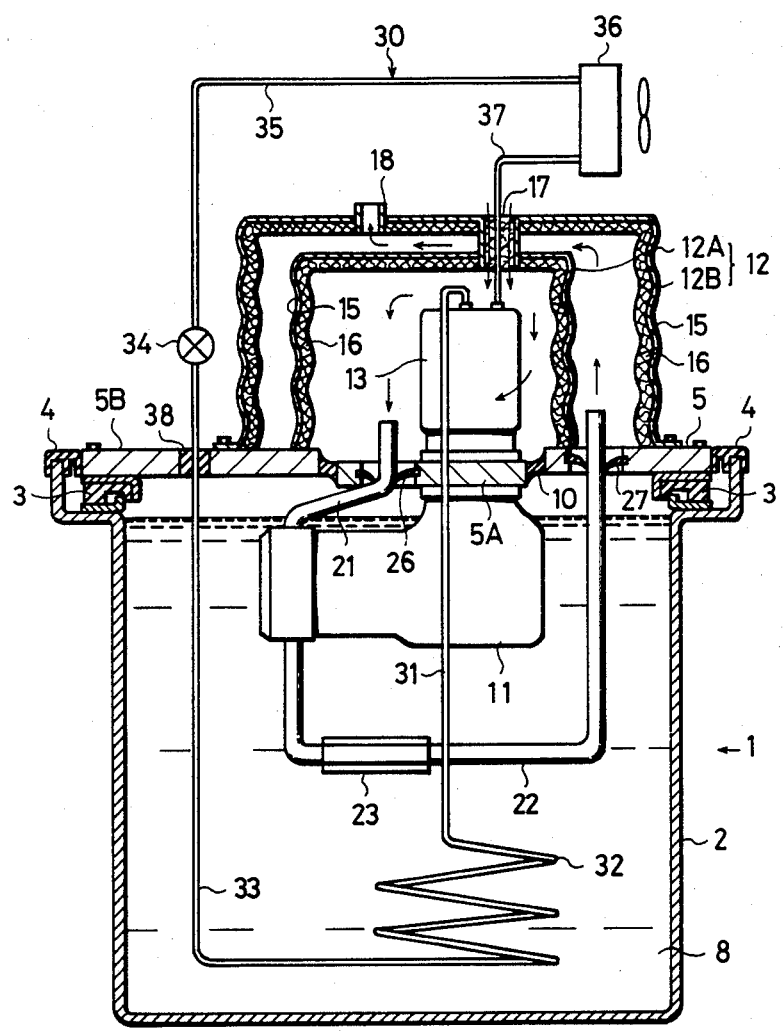

FIG. 6 shows the sixth embodiment of the present invention. In this embodiment, the inner casing 12A and the outer casing 12B of the soundproof casing 12 in the fifth embodiment are formed into forms of bellows expandable or shrinkable in the vertical direction and the capacity of the soundproof casing can be varied and set depending on the natural number of vibrations of the component such as the compressor 13, so that the noise component from the component such as the compressor 13 can be absorbed in particular. In this case, a viscoelastic material such as asphalt is preferable as the sound absorbing material 16 similarly to the embodiment in FIG. 4. Additionally, the variable capacity construction may be a telescopic one.

Figure 7:
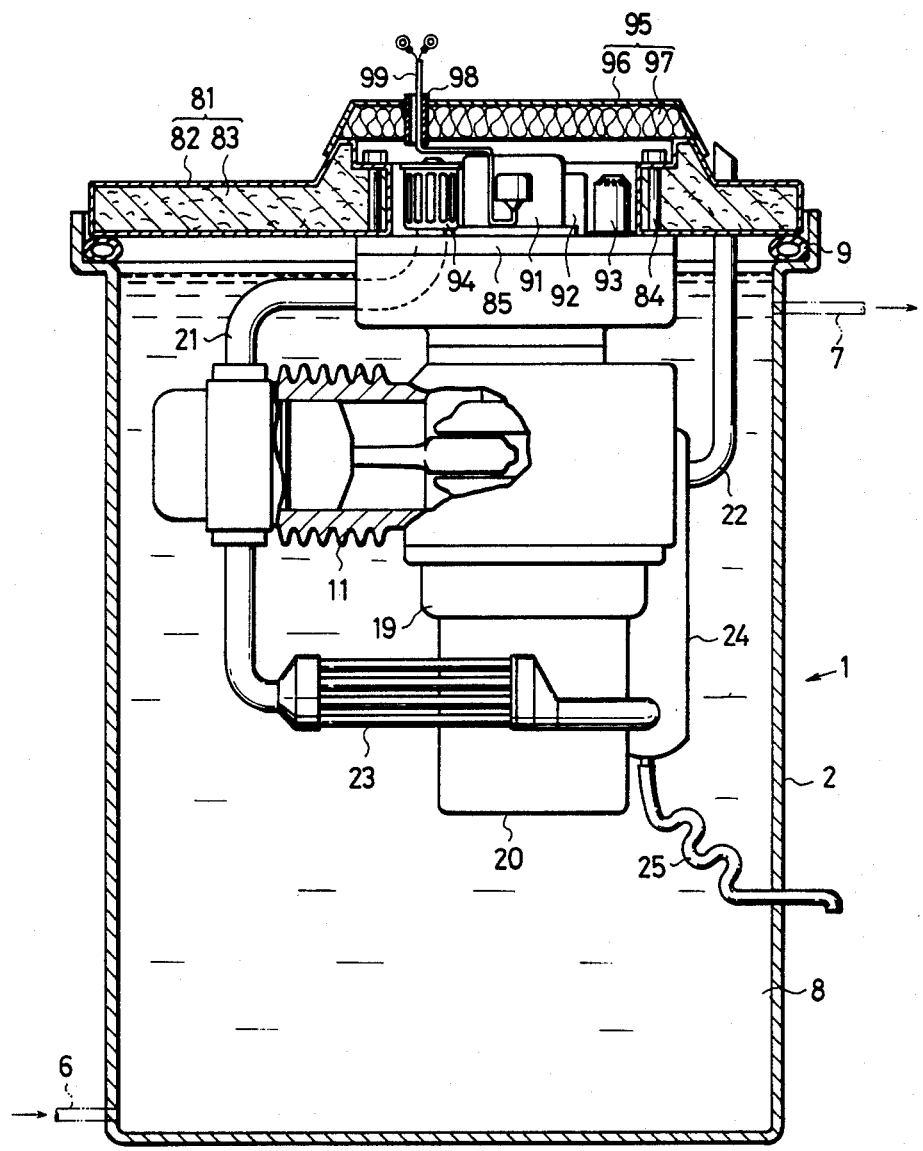

FIG. 7 shows the seventh embodiment of the present invention. In this embodiment, the engine 11 is supported by the opening of the main body of tank 2 of the tank 1 through an anti-vibration member 9 formed of a hollow ring-shaped rubber tube such as a rubber tube of a bicycle tire and a support ring 81 having a heat insulating and sound absorbing construction, and a generator 91 as being a component driven by this engine 11 is mounted. More particularly, the support ring 81 is constructed such that a ring-shaped outer shell plate 82 formed of a steel plate or a plastic material and thickened substantially at the central portion thereof is filled up with a foam material such as foamable stylene or a heat insulating-sound absorbing material 83 made of glass wool or the like. This support ring 81 and the engine 11 are solidly secured to each other through a plurality of bolts 84. In this support ring 81, on a mounting flange 85 haivng a ship form, there are provided a starter 92, an oil filter 93 and an air filter 94 mounted at the forward end of the intake pipe 21 of the engine 11, in addition to the generator 91. A cap 95 is mounted so as to cover all of the above components. This cap 95 comprises a vibration control plate 96 formed of a steel plate or the like and a heat insulating-sound absorbing material 97 made of glass wool or the like adhesively attached to the inner surface of this vibration control plate 96. A cord 99 of the generator 91 is led to outside through an air suction pipe 98 formed through this cap 95.

A float 20 formed of a sealed vessel is provided at the bottom of the engine 11 through an oil pan 19. The buoyancy of this float 20 acts not only on the engine 11 itself but also on the support ring 81 to relieve the load applied to the support ring 81. Furthermore, the exhaust pipe 22 of the engine 11 is provided at the intermediate portion thereof with the heat exchanger 23 and a muffler 24. This muffler 24 is provided thereon with a drain hose 25 for draining water drops condensed in the muffler 24 due to the heat exchange with the heat transfer medium 8 to the outside of the main body of tank 2.

In addition, the main body of tank 2 is provided with a city water supply pipe 6 and an outlet pipe 7 for the heat transfer medium 8 as necessary.

In the seventh embodiment with the above-described arrangement, in addition to the advantages described in the first embodiment, the tubular anti-vibration member 9 is used, whereby the vibrations from the engine 11 are not transmitted to the main body of tank 2 at all, and the support given by the anti-vibration member 9 is an equally distributed load for receiving the load in the ring form over the total circumference, so that the coefficient of elasticity of the rubber constituting the anti-vibration member 9 can be reduced to a considerable extent, and a further effective vibration absorbing action and the sealing action against the evaporation of moisture from the heat transfer medium 8 can be simultaneously effected. As the result of the vibration isolation thus achieved, the mechanical strength required of the main body of tank 2 from the viewpoint of anti-vibration is dispensed with, so that the main body of tank 2 can be rendered light in weight, and hence, produced inexpensively. Further, the seals are simplified in construction, the maintenance works are readily performed, and the replacement of the oil filter 93 and the air filter 94, which are subjected to frequent maintenance works can be effected only by the removal of the cap 95. Furthermore, the load borne by the support ring 81 can be relieved by the float 20 and the mechanical strength of the support ring 81 can be reduced, so that the support ring 81 can be rendered light in weight, and hence, produced inexpensively. In addition, since the anti-vibration member 9 is formed into a ring shape, the support ring 81 can be sufficiently supported without securing the anti-vibration member 9 to the main body of the tank 2, and the support ring 81 can be prevented from rotation. Further, the support ring 81 is filled up with the heat insulating and sound absorbing material 83, so that the noise control can be further satisfactorily performed. The driven components and the like are received in the support ring 81, so that the system can be reduced in its total height.

Figure 8:
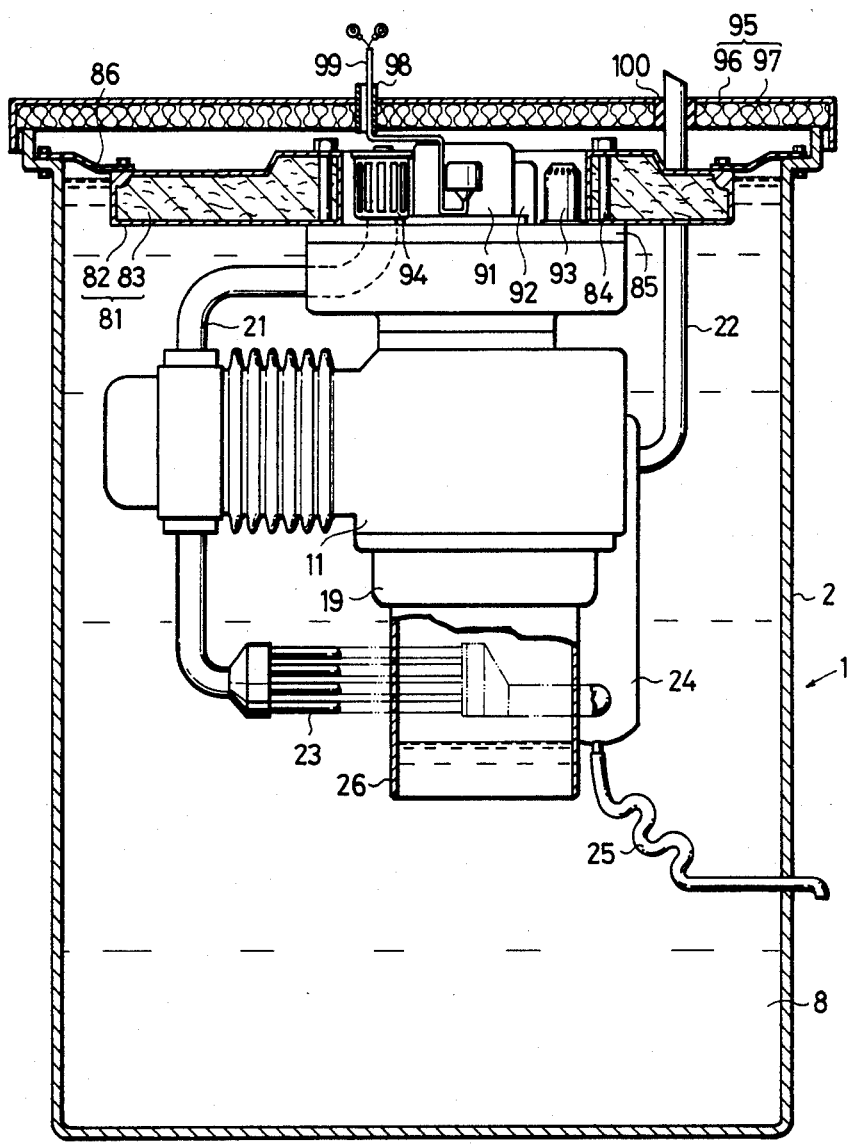

FIG. 8 shows the eighth embodiment of the present invention. In this embodiment, the support ring 81 in the seventh embodiment is partially immersed in the heat transfer medium 8 and supported by a plurality of resilient support arms 86, the cap 95 is provided for covering the whole opening of the main body of tank 2, and a heat-resistant seal 100 is provided at a portion of the cap 95, through which the exhaust pipe 22 extends. Furthermore, a float 26 in this embodiment is of a so-called air suspension type, in which the bottom thereof is opened into the heat transfer medium 8. The vibrations of the engine 11 can be absorbed through the action of air sealed in this float 26.

According to the eighth embodiment with the above-described arrangement, in addition to the anti-vibration and soundproof effects similarly to the preceding embodiments, the support ring 81 is immersed in the heat transfer medium 8, so that the system is reduced in its total height and the vertical vibration absorbing action by the float 26 can be added.

In addition, in the above eighth embodiment, the resilient support arms 86 may be replaced by rigid links, in each of which opposite ends are rotatable and at least one of the opposite ends is connected through a slot, and further, replaced by a ring-shaped resilient member, instead of a plurality of the arm-shaped ones. In the ring-shaped resilient member is adopted as described above, such disadvantages can be effectively obviated that leak is caused or electric contacts are deteriorated by the vapor of the heat transfer medium 8, which is attached to the generator 91 and the like.

Figure 9:
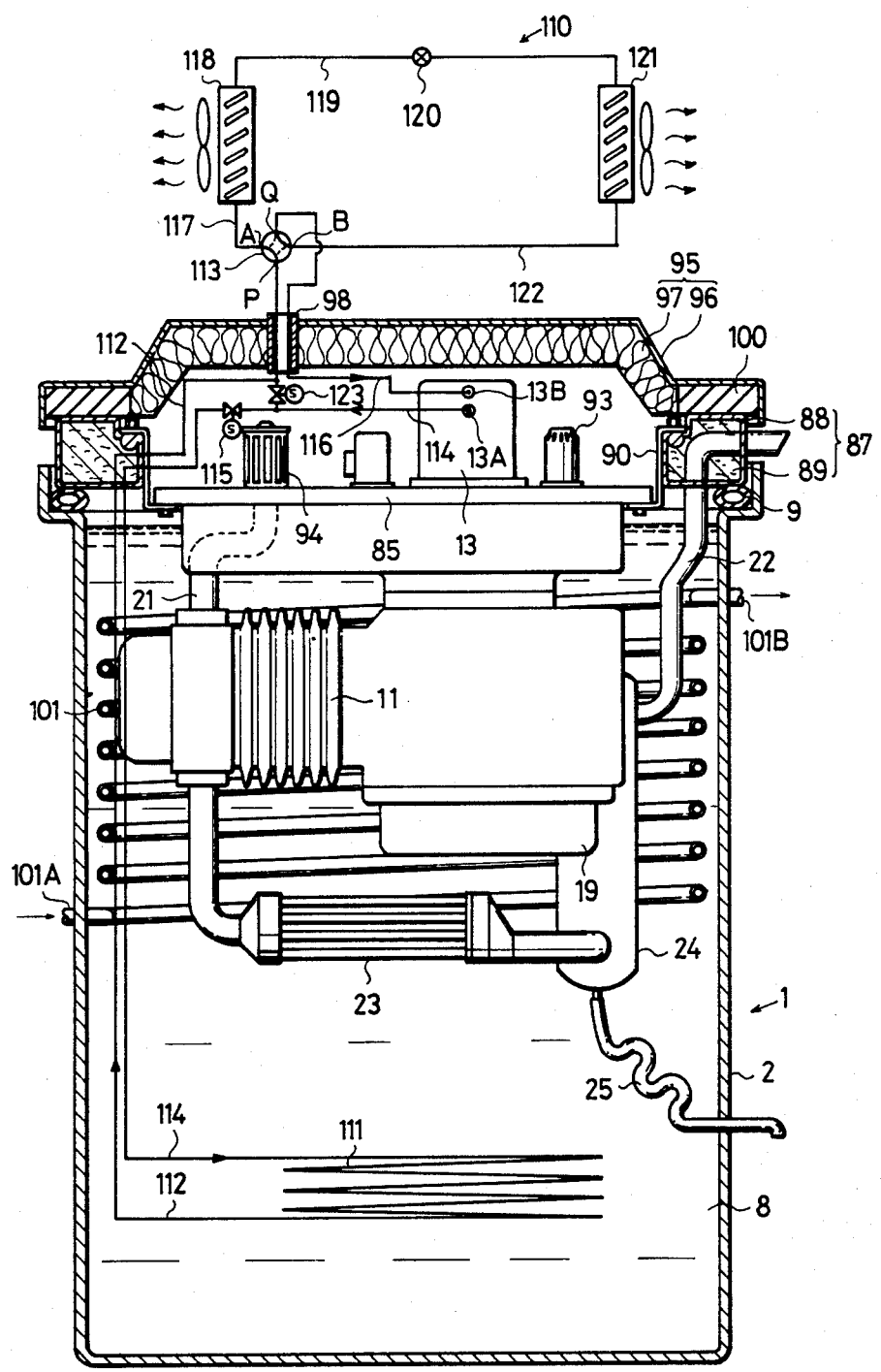

FIG. 9 shows the ninth embodiment of the present invention. In this embodiment, a coil 101 for hot water feed is provided in the upper portion of the heat transfer medium 8, and a condensor coil 111 of the heat pump circuit 110 is provided in the lower portion of the heat transfer medium 8. More specifically, when the water as being the heat transfer medium 8 subjected to the direct heat exchange in the main body of tank 2 is not suited to the use, the indirect heat exchange is conducted by use of the coil 101 for hot water feed. A city water supply port 101A is provided at the bottom end of the coil 101 for hot water feed and a hot water outlet port 101B is provided at the top end of the coil 101 for hot water feed. According to the present invention, the engine 11 is immersed in the heat transfer medium 8, whereby the temperature in the upper portion of the heat transfer medium 8 reached substantially 85° to 95° due to the stratification of temperature, whereby, even if the indirect heat exchange is conducted by use of the coil 101 for hot water feed, an utility temperature level for hot water feed (about 45° C.) can be sufficiently and readily secured. The stratification of temperature in the tank is very suitable for the radiation of heat by the condenser coil 111 of the heat pump circuit 110 as shown in the drawing. The condenser coil 111 is disposed in the low temperature zone in the lower portion of the main body of tank 2 and the engine 11 is located in the upper portion of the main body of tank 2, whereby the stratification of temperature is automatically formed, so that the efficiencies of heat radiation (heat exchange) of the condenser coil 111 and the engine 11 can be held high. Furthermore, the temperature up to about 50° C. is obtained in the lower half portion of the main body of tank 2 and the temperature up to about 50° C. to 90° C. is obtained in the upper half portion of the main body of tank 2, so that the proper use can be selectively made depending upon the purpose.

The above-described arrangement, in which the engine 11 is merely immersed in the heat transfer medium 8 (for example, water), is not only convenient for the stratification of temperature and heat recovery but also the anti-vibration measures can be readily and reliably taken. Moreover, the noise arresting effect is high (because of the presence of the engine 11 and the like in the water) and no problem is found with the maintenance works for the engine 11.

The heat pump circuit 110 is of a directly expanded coolant type and of such an arrangement as will be described below. A pipe 112 from an outlet of the condenser coil 111 is connected to a port P of a four-way valve 113, a pipe 114 from an inlet of the condenser coil 111 is connected to a discharge port 13A of the compressor 13, and a solenoid valve 115 is provided in the intermediate portion of this pipe 114. A suction port 13B of the compressor 13 is connected to one end of a pipe 116, the other end of which is connected to a port Q of the four-way valve 113, and a port A of the four-way valve 113 is connected to one end of a pipe 117, the other end of which is connected to one end of an outdoor heat exchanger 118 formed of a so-called Fan-coil Unit. A pipe 119, one end of which is connected to the other end of this outdoor heat exchanger 118, is provided in the intermediate portion thereof with an expansion valve 120 and the other end of the pipe 119 is connected to one end of an indoor heat exchanger 121 formed of a Fan-coil Unit. The other end of this indoor heat exchanger 121 is connected to one end of a pipe 122, the other end of which is connected to a port B of the four-way valve 113. This port P of the four-way valve 113 is made connectible to the port A or the port B, and the port Q is made connectible to the port B or the port A. Further, the intermediate portion of a pipe 114 connected to the discharge port 13A of the compressor 13, i.e., a portion of the pipe 114 between the solenoid valve 115 and the discharge port 13A and the intermediate portion of a pipe 112 from the outlet of the condenser coil 111 can be communicated with or blocked from each other through a solenoid valve 123.

With the above-described arrangement, in order to operate the system for cooling the room, the system should be operated in the same manner as the conventional heat pump while the four-way valve 113 is brought into the state indicated by solid lines, i.e., the port P is communicated with the port A and the port Q is communicated with the port B. Since the condenser coil 111 is immersed in the heat transfer medium 8 in the main body of tank 2 in this case, the heat transfer medium 8 can be raised in temperature while the room is cooled by the indoor heat exchanger 121. When the solenoid valve 115 is closed and the solenoid valve 123 is switched to be opened, heat can be radiated from the outdoor heat exchanger 118. If the four-way valve 113 is switched to the direction indicated by broken lines, i.e., the port P is communicated with the port B and the port Q is communicated with the port A, then, the operation of heating the room is performed.

Furthermore, in this embodiment, the exhaust pipe 22 of the engine 11 is projected to outside through the support ring 87, so that the cap 95 can be easily mounted or demounted, and further, the exhaust noises can be reduced through the action of a heat insulating-sound absorbing material 89. Further, a seal member 100 made of rubber or the like on the cap's side is disposed at a portion where the cap 95 is in contact with the support ring 87, so that the anti-vibration and sound absorbing can be reliably effected with the cooperation of the tubular anti-vibration member 9.

In addition, in this ninth embodiment, if there is provided a separate heat absorbing coil communicated with the pipes 112 and 114 at the outlet and the inlet of the condenser coil 111 and immersed in the high temperature portion upwardly disposed in the heat transfer medium 8, and the coolant in the heat pump circuit 110 is communicated to the aforesaid separate coil, then, when the room heating power of the heat pump circuit 110 is lowered owing to lowered ambient temperature, the coolant is passed through the heat absorbing coil disposed in the high temperature portion, so that the room heating power can be secured at a predetermined degree.

Figure 10:
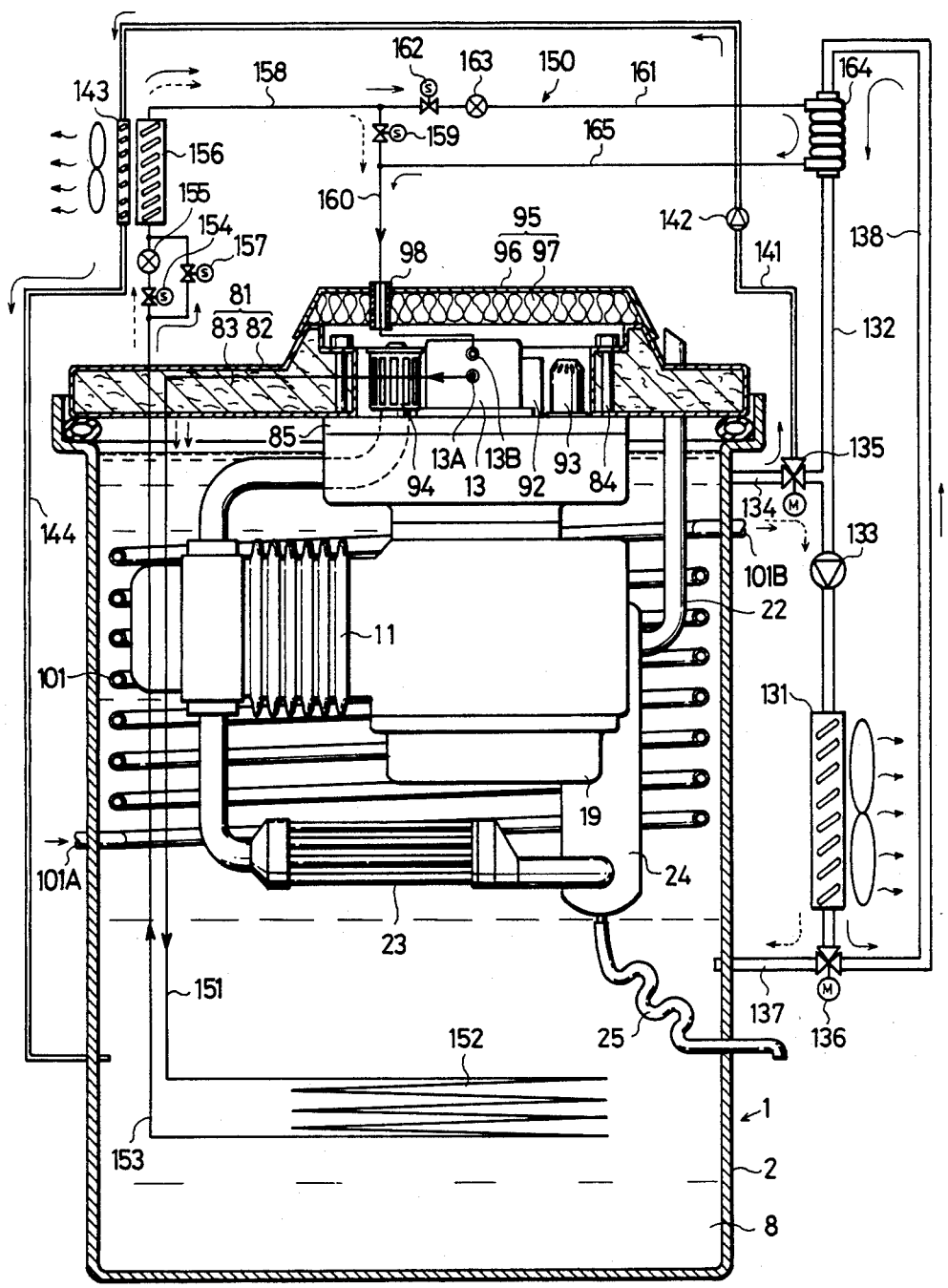

FIG. 10 shows the tenth embodiment of the present invention. In this embodiment, the compresor 13 is installed instead of the generator 91 as being the driven component in the embodiment shown in FIG. 7, a heat pump circuit 150 different from one shown in the embodiment in FIG. 9, an indoor heat exchanger 131 formed of the Fan-coil Unit is disposed in the room, and the heat transfer medium 8 in the main body of tank 2 is circulated. In other words, this embodiment is an example where the operation of cooling and heating the room by a so-called brine circulation. More specifically, during heating of the room, a circulating pump 133 provided on a pipe 132 at the inlet of the indoor heat exchanger 131 is driven, the high temperature portion of the heat transfer medium 8 in the tank, in which the stratification of temperature is effected, is sucked from a pipe 134 of the high temperature portion, fed in a direction indicated by an arrow mark of a broken line through a manual three-way valve 135 and the pipe 132 to the indoor heat exchanger 131, where the heat transfer medium 8 radiates the heat, and returned to the main body of tank 2 through a manual three-way valve 136 and a pipe 137 of the low temperature portion. Meanwhile, in the heat pump circuit 150, the coolant, which has been compressed into a high-temperature high-pressure gas and gone out of the discharge port 13A of the compressor 13, is passed through a pipe 151 to a condenser coil 152, where the gas radiates the heat to be liquefied, passed through a pipe 153 to a branched portion, where the coolant is passed through a solenoid valve 154 and an expansion valve 155 to be expanded, as indicated by an arrow mark of a broken line, and led into an outdoor radiator 156. In this case, a solenoid valve 157 provided in parallel to the solenoid valve 154 and the expansion valve 155 is closed. The coolant, which has entered the outdoor radiator 156, absorbes the heat in the outdoor radiator 156, subsequently, is passed through a pipe 158 to a branched portion, where the coolant is passed through a short cut, i.e., a solenoid valve 159 as indicated by an arrow mark of a broken line, is led through a pipe 160 on the suction side of the compressor and the suction port 13B to the compressor 13, where the coolant is compressed, and thereafter, successively circulates the aforesaid circuit. Since a solenoid valve 162 provided in a pipe 161 on the side of heat exchange in the vicinity of the branched portion of the pipe 158 is closed in this case, no coolant flows through an expansion valve 163 provided in a pipe 161, a coolant-brine heat exchange coil 164 and a heat exchange return pipe 165.

On the other hand, during cooling the room, the three-way valve 135 in the pipe 134 of the high temperature portion is closed and the three-way valve 136 in the pipe 137 of the low temperature portion is switched, so that the brine, which has been passed through the indoor heat exchanger 131, can flow to a circulation pipe 138. Furthermore, in the heat pump circuit 150, the solenoid valve 154 on the side of the expansion valve 155 positioned at the inlet of the outdoor heat radiator 156 is closed and the solenoid valve 157 provided in parallel thereto is opened, the solenoid valve 159 on the short cut's side is closed, and the solenoid valve 162 on the side of the heat exchange coil is opened. With the above arrangement, the coolant, which has been expanded in the expansion valve 163, flows in a direction indicated by an arrow mark of a solid line to the coolant-brine heat exchange coil 164, where the coolant absorbs the heat to cool the brine in the pipe 132 on the brine's side, returns to the suction port 13B of the compressor 13, and circulates through the circuit passing through the condenser coil 152 and reaching the heat exchange coil 164 in the same manner as described above. The brine in the pipe 132 on the indoor side, which has been cooled by the heat exchange coil 164, is driven by the pump 133 to pass the indoor heat exchanger 131 and cools the room, thereafter, is passed through the three-way valve 136 and the pipe 138, cooled again in the heat exchange coil 164, and circulates in the direction indicated by the arrow marks of solid lines in the same manner as described above.

During the room cooling operation as described above, when the heat transfer medium 8 in the main body of tank 2 is heated to an excessively high temperature as the result of continuous operation of the engine 11, the following process should be followed. Namely, the three-way valve 135 in the pipe 134 of the high temperature portion is switched to connect the pipe 134 of the high temperature portion to a pipe 141 for heat radiation, a circulation pump 142 is operated to feed the high temperature heat transfer medium 8 to a radiator 143, where the heat transfer medium is cooled, and the heat transfer medium is returned to the lower portion of the main body of tank 2 through a return pipe 144.

The hot water feed in this embodiment is conducted in the same manner as in the embodiment shown in FIG. 9.

According to the tenth embodiment with the above-described arrangement, in addition to the advantages described in the ninth embodiment, the cooling and heating of the room at a high efficiency can be effected by direct use of the heat transfer medium 8 in the main body of tank 2.

Figure 11:
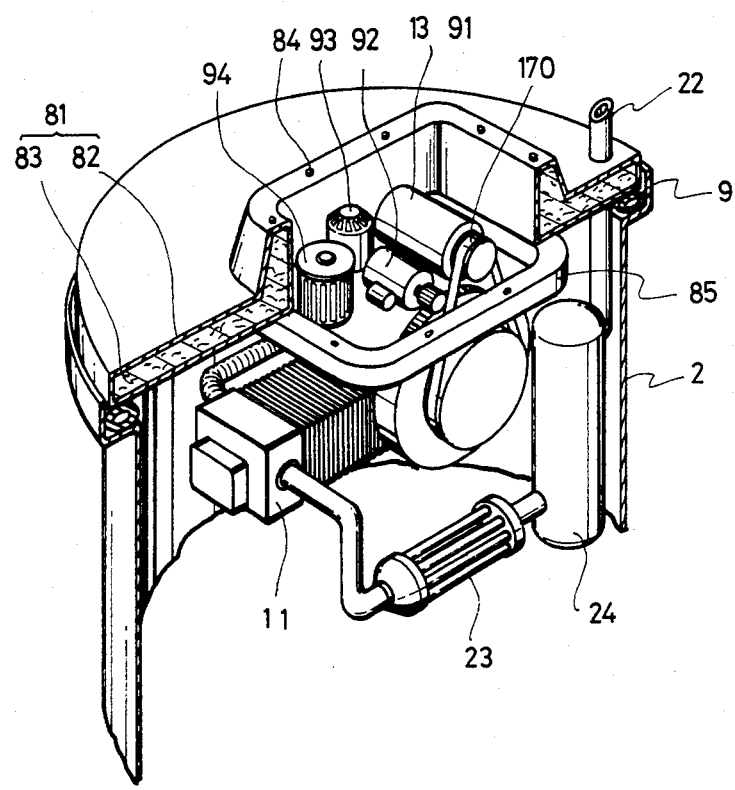
FIG. 11 is a longitudinal perspective view showing the essential portions of an eleventh embodiment of the present invention.

FIG. 11 shows the essential portions of the eleventh embodiment of the present invention. This embodiment illustrates the case where the output shaft of the engine 11 is laid in the horizontal direction. In this case, the compressor 13 or the generator 91 as being the driven component should be driven by use of a belt 170 as shown in the drawing. With this arrangement, the reduction or speed up ratio of the driven component can be desirably set. Furthermore, when the compressor 13 is the driven component, the rotary shaft of the compressor 13 is connected to the horizontal output shaft of the engine 11 and the compressor 13 may be immersed in the heat transfer medium together with the engine 11, because the electrical insulation and the like can be dispensed with. With this arrangement, it is advantageous that the exhaust heat from the compressor 13, the surface temperature of which reaches about 80° C., can be effectively recovered.

In addition, in the respective embodiments described above, the engine 11 is substantially wholly immersed in the heat transfer medium 8 in the tank 1, however, the engine 11 need not necessarily be substantially wholly immersed in the heat transfer medium 8 because the tank 1 has the sealed construction. Even when a part of the engine 11 is immersed in the heat transfer medium 8, the heat utilizing and noise reduction of the engine 11 can be effected. Needless to say, if the engine 11 is substantially wholly immersed in the heat transfer medium 8 in the tank, then a higher efficiency can be attained because the substantially total amount of the heat from the engine 11 can be utilized directly for heating the heat transfer medium 8. Furthermore, according to the present invention, the component driven by the engine 11 need not necessarily be limited to the compressor 13 or the generator 91, but, any other component such as a pump may be adopted.

As has been described above, the present invention is advantageous in that the exhaust heat and the like from the internal combustion engine can be effectively utilized and the anti-vibration and noise arresting measures can be readily carried out.

What is claimed is:

1. A heat utilizing system using an internal combustion engine, said heating system comprising:
   (a) a vessel containing a heat transfer medium therein and having a top, said vessel top being provided with an opening;
   (b) an internal combustion engine, at least part of said internal combustion engine being immersed in said heat transfer medium and being supported by a support member provided on said vessel opening;
   (c) an exhaust pipe for conducting hot exhaust gases away from said internal combustion engine, said exhaust pipe being immersed in said heat transfer medium and attached to said internal combustion engine, said heat transfer medium thus comprising a heat sink for waste heat from said internal combustion engine and for heat taken from said exhaust gases conducted away from said engine by said exhaust pipe; and (d) a component driven by said internal combustion engine.

2. A heat utilizing system using an internal combustion engine as set forth in claim 1, wherein a generator is used as said driven component.

3. A heat utilizing system using an internal combustion engine as set forth in claim 2, wherein means for taking the heat transfer medium out of the vessel is provided.

4. A heat utilizing system using an internal combustion engine as set forth in claim 1, wherein said driven component is a coolant compressor of a heat pump.

5. A heat utilizing system using an internal combustion engine as set forth in claim 4, wherein said heat pump has a condenser coil, said coil being disposed in the heat transfer medium in said vessel.

6. A heat utilizing system using an internal combustion engine as set forth in claim 4, wherein a heat exchange coil for hot water feed is disposed in the heat transfer medium in said vessel.

7. A heat utilizing system using an internal combustion engine as set forth in claim 5, wherein said condenser coil of the heat pump is disposed in a lower portion of said vessel and a heat exchange coil for hot water feed is disposed in the heat transfer medium at a position upwardly of said condenser coil.

8. A heat utilizing system using an internal combustion engine as set forth in claim 4, wherein means for taking the heat transfer medium out of the vessel is provided.

9. A heat utilizing system using an internal combustion engine, said system comprising:

(a) a vessel containing a heat transfer medium and having a top which is provided with an opening;

(b) an internal combustion engine, at least a part of said internal combustion engine being immersed within said heat transfer medium, said internal combustion engine being supported by a support member which is provided on said vessel opening;

(c) an exhaust pipe for conducting hot exhaust gases away from said internal combustion engine, said exhaust pipe being immersed in said heat transfer medium and attached to said internal combustion engine, wherein said heat transfer medium comprises a heat sink for waste heat from said internal combustion engine and for heat taken from said exhaust gases conducted away from said engine by said exhaust pipe;

(d) a component driven by said internal combustion engine; and (e) a soundproof casing comprising means for covering at least a part of said supporting element for said internal combustion engine and said driven component.

10. A heat utilizing system using an internal combustion engine as set forth in claim 9 wherein said soundproof casing comprises a vibration control plate and at least one sound absorbing material adhesively attached to at least one of the inner and outer surfaces of said vibration control plate.

11. A heat utilizing system using an internal combustion engine as set forth in claim 10, wherein said sound absorbing material is made of a material having heat insulating properties.

12. A heat insulating system using an internal combustion engine as set forth in claim 9, wherein said soundproof casing is of a variable capacity type.

13. A heat utilizing system using an internal combustion engine as set forth in claim 9, wherein sound conditioning passageways for conditioning at least one of intake sounds and exhaust sounds from said internal combustion engine is provided in said soundproof casing.

14. A heat utilizing system using an internal combustion engine as set forth in claim 9, wherein said soundproof casing has a double wall construction.

15. A heat utilizing system using an internal combustion engine, comprising:

a vessel containing therein a heat transfer medium and provided at the top thereof with an opening;

an internal combustion engine, at least a part of which is immersed in said heat transfer medium, supported by a member provided on the opening of said vessel;

a component driven by said internal combustion engine;

a soundproof casing for covering at least a part of the supporting portion for said internal combustion engine and said driven component; and anti-vibration members interposed between said internal combustion engine and a member for supporting said internal combustion engine.

16. A heat utilizing system using an internal combustion engine as set forth in claim 15, wherein lip seals are provided at portions of a member supporting said internal combustion engine, through which an intake pipe and an exhaust pipe extend.

17. A heat utilizing system using an internal combustion engine as set forth in claim 15, wherein sound conditioning passageways for conditioning at least one of intake sounds and exhaust sounds from said internal combustion engine is provided in said soundproof casing.

18. A heat utilizing system using an internal combustion engine as set forth in claim 15, wherein a ring-shaped support ring is provided at the opening of said vessel, said internal combustion engine and said driven component are supported by said support ring, and a soundproof casing is provided on said support ring in a manner to cover said internal combustion engine and said driven component.

19. A heat utilizing system using an internal combustion engine as set forth in claim 16, wherein a ring-shaped anti-vibration member provided over the total circumference of said opening and differing from said anti-vibration members are interposed between said support ring and the opening of said vessel.

20. A heat utilizing system using an internal combustion engine as set forth in claim 15, wherein said internal combustion engine is provided thereon with a float for giving a buoyancy thereto.

* * * * *